United States Patent [19]
Kreimann

[11] 3,727,381
[45] Apr. 17, 1973

[54] AGITATOR FOR MARBLE BED GAS SCRUBBER

[75] Inventor: Herbert H. Kreimann, Bloomfield, Conn.

[73] Assignee: Combustion Engineering Inc., Windsor, Conn.

[22] Filed: Mar. 26, 1971

[21] Appl. No.: 128,321

[52] U.S. Cl. .................. 55/233, 55/242, 55/474, 259/4, 259/DIG. 17, 261/97, 55/91
[51] Int. Cl. ............................................. B01d 46/38
[58] Field of Search .......... 55/91–92, 233, 242, 301, 55/302, 474, 390; 261/94, 97; 210/81, 272, 276; 34/57 A; 259/4, DIG. 17

[56] References Cited

UNITED STATES PATENTS

| | | | |
|---|---|---|---|
| 3,556,490 | 1/1971 | Bockman | 55/91 X |
| 2,296,824 | 9/1942 | Ashworth | 210/81 X |
| 3,219,324 | 11/1965 | Williams et al. | 55/91 UX |
| 3,536,305 | 10/1970 | Le Francois | 261/124 X |

FOREIGN PATENTS OR APPLICATIONS

| | | | |
|---|---|---|---|
| 837,313 | 11/1938 | France | 261/77 |

Primary Examiner—Tim R. Miles
Assistant Examiner—Vincent Gifford
Attorney—Carlton F. Bryant, Stephen A. Schneeberger, Eldon H. Luther, Robert L. Olson, John F. Carney, Richard H. Berneike and Lawrence P. Kessler

[57] ABSTRACT

An agitator for a marble bed wet gas scrubber having an upright housing in which the bed of marbles forms a plurality of diverse, tortuous flow paths for the gases. A plurality of horizontally extending nozzles positioned adjacent a perforate support means for the marbles directs jets of high velocity fluid into the bed, thereby preventing plugging of the diverse and tortuous paths.

1 Claim, 3 Drawing Figures

AGITATOR FOR MARBLE BED GAS SCRUBBER

BACKGROUND OF THE INVENTION

The invention relates to a wet scrubber for removing impurities from dirty gases. Air pollution is a problem of major importance today. Many industries, especially where combustion processes are carried out, are looking for means whereby impurities in the combustion gases can be effectively and ecomonically removed. These impurities can be the result of incomplete combustion of fuel, and/or foreign substances originally contained in the fuel. One means widely used today is a wet scrubber having a fluidized bed filter, through which the contaminated gases flow. Liquid is sprayed into the gas stream, and the liquid droplets along with entrapped solid particles are culled out of the gases as they flow through the plurality of diverse, tortuous flow paths of the fluidized bed. Problems are encountered in the use of fluidized beds if the flow velocity of the dirty gases is too low, or if the flow distribution through the fluidized bed is not equal; i.e., heavy flow near the side walls, with little in the central area, or vice versa. This can cause lodging of separated solids within the fluidized bed, thereby decreasing efficiency and increasing maintenance costs.

SUMMARY OF THE INVENTION

The wet scrubber of my invention utilizes a fluidized bed for separating impurities from gases flowing therethrough. Located in the bottom portion of the fluidized bed are a series of nozzles through which high velocity jets of fluid are directed horizontally into the bed, causing agitation thereof to prevent plugging of the bed passages.

DESCRIPTION OF THE PREFERRED EMBODIMENT

Figure 1:
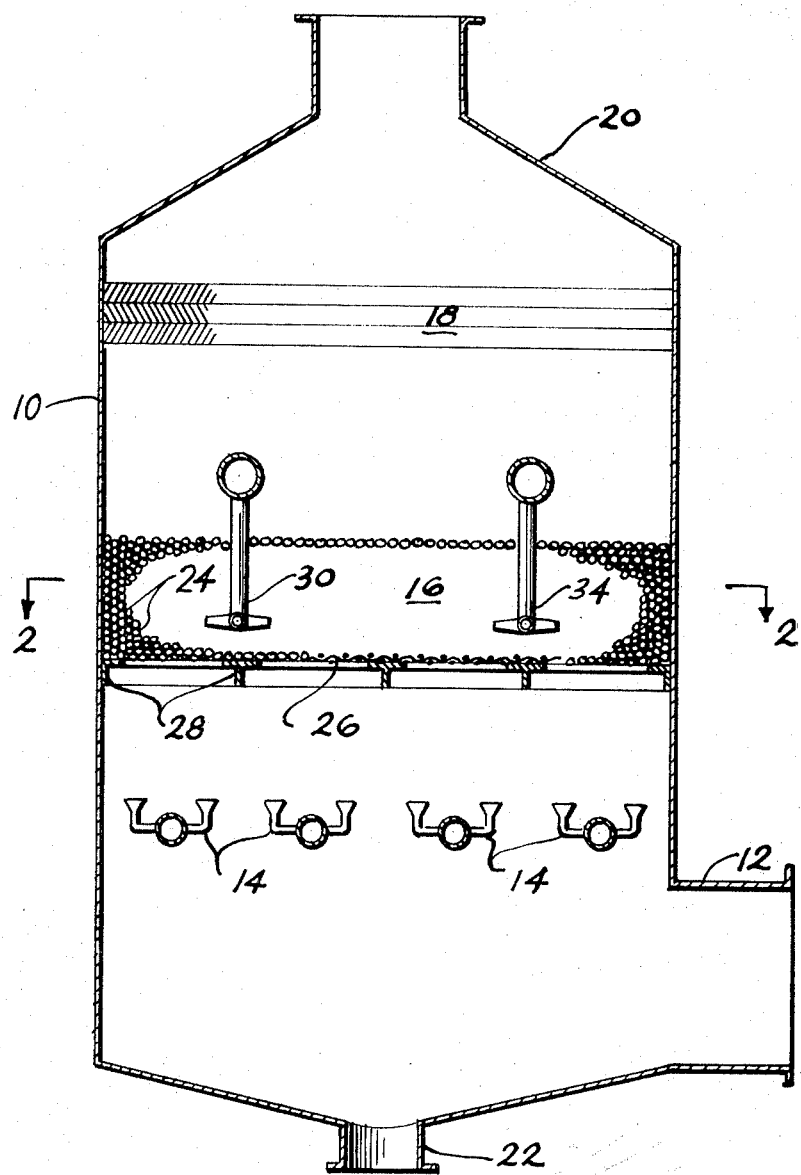
FIG. 1 is a vertical sectional view of a marble bed wet scrubber constructed in accordance with the invention.

Looking now to FIG. 1 of the drawings, 10 designates a wet scrubber housing having a gas inlet 12 in the lower portion thereof. The dirty gases, for example combustion gases exhausted from a furnace, turn and flow upwardly through a wetting zone, where a plurality of water sprays are discharged from nozzles 14. A large amount of the solid contaminants are entrapped by the water particles in this spray zone. The gases then proceed upwardly, passing through the fluidized bed 16, the water droplets are brought into intimate contact with all portions of the gases, causing entrapment of the majority of the solids by the water.

After leaving the fluidized bed 16, the gases proceed through the demister 18, and leave the scrubber through outlet 20. The demister 18 is made up of a number of closely spaced zig-zag baffle members. The gases in passing through this apparatus, with the continuing change in flow direction, deposits most of the water droplets on the baffle members, where they run down to the bottom edges and fall into the fluidized bed 16. The bottom of housing 10 is tapered downwardly to a central discharge opening 22, through which the spray water and separated solids are removed from the housing.

Figure 2:
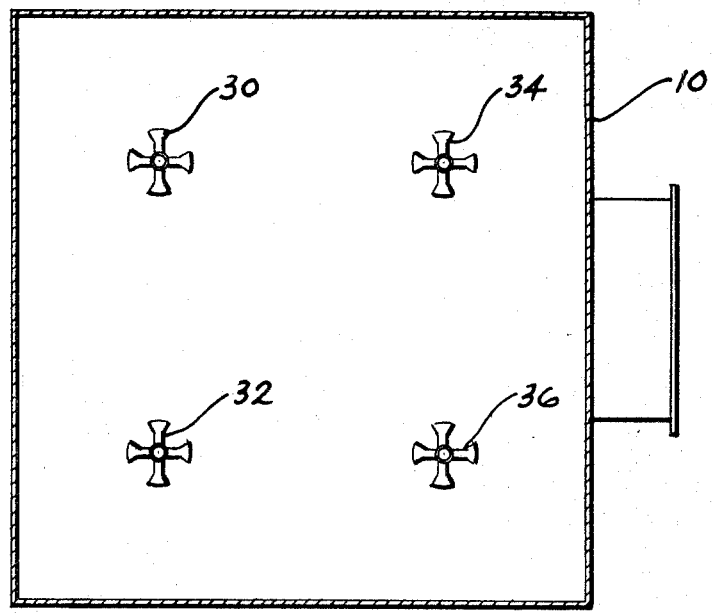
FIG. 2 is a sectional view taken on line 2—2 of FIG. 1, with the bed marbles not shown, illustrating the arrangement of the agitating nozzles.

The fluidized bed is comprised of a plurality of spherical marble members 24 which lie on a perforate support member 26, which could be a screen or perforated plate. Screen 26 is supported on a beam grid or latticework 28. Extending down into the marble bed are four feedpipes, 30 32, 34 and 36. These feedpipes have extending from each of them a set of four horizontal nozzles, one extending in each direction (see FIG. 2). The feedpipes, 30, 32, 34 and 36 are spaced such that the high velocity water jets issuing from the nozzles during operation are sufficient to agitate the entire marble bed. Depending on the size and shape of the bed, and the pressure of the water supply, more or less feedpipes, spaced differently, would be used. The important thing is that substantially the entire marble bed can be agitated by the water jets issuing from the nozzles.

The operation of the scrubber will now be described. Combustion gases laden with solid contaminants enter the scrubber housing 10 through inlet 12. The gases pass upwardly through water sprays where many of the solids are captured by the water droplets. The gases then flow through the multiplicity of tortuous, diverse passages formed by the marbles 24 within the filter bed 16. This causes intimate contact of the remaining free solids with water causing entrapment of these particles by the water. Any liquid carried over from the filter bed along with the gases is separated out by demister 18.

Figure 3:
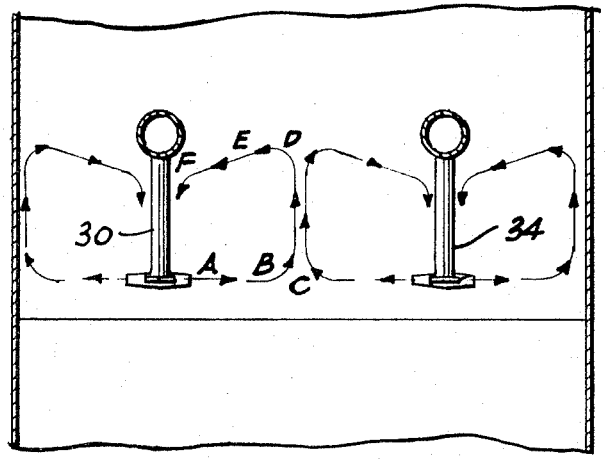
FIG. 3 is a schematic showing the pattern the bed marbles will assume in response to the high velocity fluid flow from the agitating nozzles.

The flow velocity of the gases through the scrubber is generally such that the marbles within bed 16 are maintained in a fluidized state. The velocity of the water jets issuing from the agitator nozzles attached to pipes 30, 32, 34 and 36 is such that they cause agitation of substantially the entire bed. The pattern the marbles assume is shown in FIG. 3. The high velocity water jets will force the marbles at points A and B outwardly towards point C. At point C, the resistance of the marbles being forced outwardly from the opposing nozzle causes the forces to turn upwardly, forcing some of the marbles towards point D. This movement, along with the cavities formed at points A and B, will cause some of the marbles at points E and F to fall by gravity downwardly. Thus, the marble bed assumes a pattern similar to that illustrated in FIG. 3.

The above agitation of the bed prevents plugging of the diverse and tortuous flow paths formed by the layers of marbles. Plugging can be caused by gases that are heavily laden with solid continents, or by low flow velocities of the gases through the scrubber. Low flow velocities can be caused by (1) a lowering of the firing load of the furnace, causing low flow throughout the entire filter bed; or (2) localized low flow; i.e. greater flow along the wall of the scrubber opposite the gas inlet 12. If (2) above is the situation, the system may be designed for continuous operation of the nozzles associated with pipes 34 and 36, with intermittent operation of the nozzles associated with feedpipes 30 and 32.

The tortuous flow paths formed by the aggregate members or marbles increase in size as the gas and water are forced through them, in essence forcing them apart and floating or lifting them from their rest position, and spinning and twirling them in place. A low flow allows the marble to settle causing reduction in the path size and in the spinning action with an increased potential of passage blockage by particles. Blockage increases flow resistance causing less gas flow in the afflicted area magnifying maldistribution of gas flow and the potential for particle trapping and eventual complete plugging as the aggregate members come to rest and collect deposits forming a solid mass of aggregate, particles and chemical reagents. This plugging grows from the point of origin. The increased gas flow through the remaining open passages forces the aggregate further apart at first decreasing the efficiency of the scrubbing action at increasing rate until eventually a whole section of aggregate is blown from the bed, spilling the displaced marbles onto the plugged or frozen portion. At this point the scrubber ceases to function performance-wise, forcing shutdown for rebedding. The causes maintenance and outage costs. If the impurities to be removed from the gas and the chemical reagents have adherance properties a large portion of the aggregate must be discarded and in severe cases serious difficulty may be encountered in removal and restoration to service of the scrubber. The agitator system serves to prevent aggregate settling and passage blocking, by jet action and by over all aggregate motion. It helps prevent aggregate clusters, and causes breaking up of such clusters when they do occur. It provides water supply independent of gas flow rate, which means there will be water available and aggregate motion even if there is low or no gas flow, with consequent washing of the aggregate and thus prevention of freezing of large areas.

The water jets from the nozzles not only perform the function of agitating the marble bed to prevent plugging thereof, but they can also be used to supply all or a portion of the scrubbing water required in the wet scrubber. Thus it may be possible to eliminate the spray nozzles 14 altogether, or greatly reduce the water supply to these nozzles. This would result in a saving in pump capacity, since one third or more of the spray water from nozzles 14 never gets into the bed 16 because of the closed area of the screen or perforated plate 26. Water is needed in the fluidized bed 16 in order to have a high percentage entrainment of the small or minutely sized particle contaminants.

What is claimed is:

1. Apparatus for separating solids from gases including in combination an upright housing having a gas inlet in its lower portion, a gas outlet in its upper portion, a filter bed located in the housing intermediate the inlet and outlet, the filter bed including a plurality of filter elements arranged to lie in a bed in a plurality of layers, extending across the entire cross section of the upright housing, perforate support means positioned beneath the filter elements, said filter elements forming a plurality of diverse and tortuous paths for the gases flowing upwardly therethrough, the flow velocity of the gases through the filter bed being such as to maintain the filter elements in a fluidized state, a plurality of horizontally positioned nozzle means located in the filter elements in a layer closely adjacent the perforate support means, through which a high velocity liquid can be directed horizontally, to cause agitation and movement of the filter elements, the nozzle means being restricted sufficiently such that the filter elements horizontally adjacent to each nozzle means are moved horizontally by the high velocity liquid flow issuing therefrom thus forming a void, allowing the filter elements thereabove to fall by gravity into the void, setting up a circulation of the filter elements, thereby preventing plugging of the diverse and tortuous paths, the liquid further acting as the means to entrap solid particles contained in the gases.

* * * * *